(12) United States Patent
Leon et al.

(10) Patent No.: US 7,207,758 B2
(45) Date of Patent: Apr. 24, 2007

(54) FASTENING DEVICE, PARTICULARLY FOR HOLDING TOGETHER A STACK OF AT LEAST TWO PANELS

(75) Inventors: Jean-Pierre René Leon, Houilles (FR); Rodolphe Dominique Gilles Perol, Paris (FR); Gilles Jean Michel Marcel, Parmain (FR)

(73) Assignee: LISI Automotive Rapid, Puiseux (FR)

( * ) Notice: Subject to any disclaimer, the term of this patent is extended or adjusted under 35 U.S.C. 154(b) by 0 days.

(21) Appl. No.: 10/814,597

(22) Filed: Apr. 1, 2004

(65) Prior Publication Data

US 2004/0223826 A1 Nov. 11, 2004

(30) Foreign Application Priority Data

Apr. 3, 2003 (FR) .................................. 03 04155

(51) Int. Cl.
*F16B 13/06* (2006.01)

(52) U.S. Cl. ...................................................... 411/45

(58) Field of Classification Search ........ 411/356–358, 411/49, 46–48, 349, 549–550, 552–553, 544–545, 411/45, 54, 54.1, 352–353, 508–512, 913, 411/44; 24/297
See application file for complete search history.

(56) References Cited

U.S. PATENT DOCUMENTS

| | | | | |
|---|---|---|---|---|
| 2,303,148 | A * | 11/1942 | Tinnerman .................. | 411/111 |
| 2,571,394 | A * | 10/1951 | Trafton ........................ | 411/112 |
| 3,645,311 | A * | 2/1972 | Tinnerman ................... | 411/173 |
| 3,800,369 | A * | 4/1974 | Nikolits et al. ............. | 24/590.1 |
| 4,007,516 | A * | 2/1977 | Coules ........................ | 411/349 |
| 4,630,338 | A * | 12/1986 | Osterland et al. .............. | 24/293 |
| 4,878,791 | A * | 11/1989 | Kurihara et al. .............. | 411/55 |
| 4,927,287 | A * | 5/1990 | Ohkawa et al. .......... | 403/408.1 |
| 5,011,355 | A * | 4/1991 | Motoshige ................... | 411/552 |
| 5,100,273 | A * | 3/1992 | Vassiliou .................... | 411/80.1 |
| 5,201,623 | A * | 4/1993 | Benedetti et al. ............. | 411/48 |
| 5,368,427 | A * | 11/1994 | Pfaffinger .................... | 411/553 |
| 5,641,255 | A * | 6/1997 | Tanaka ......................... | 411/48 |
| 5,718,549 | A * | 2/1998 | Noda et al. .................. | 411/553 |
| 5,774,949 | A * | 7/1998 | Cornell et al. ................. | 24/293 |

(Continued)

FOREIGN PATENT DOCUMENTS

| | | |
|---|---|---|
| FR | 2790046 | 8/2000 |
| WO | 00/49299 | 8/2000 |
| WO | WO 00/49299 * | 8/2000 |

*Primary Examiner*—Robert J. Sandy
*Assistant Examiner*—Jeffrey A. Sharp
(74) *Attorney, Agent, or Firm*—Leydig, Voit & Mayer, Ltd.

(57) ABSTRACT

The invention relates to a fastening device for holding together a stack of at least two panels, comprising a female piece in the form of a clasp, and a male piece having a part in the form of a head, and a part in the form of shaft with a cross section in the form of a cam which can be axially inserted into the clasp. The device includes a component for immobilization of the male piece in the female piece which is connected with clasp and is produced in the form of finger which can be moved by deliberate action between a position of engagement in a notch of the head of the male piece, and a position of disengagement from said notch.

9 Claims, 3 Drawing Sheets

U.S. PATENT DOCUMENTS

| | | | |
|---|---|---|---|
| 5,775,860 A * | 7/1998 | Meyer | 411/46 |
| 5,803,532 A * | 9/1998 | Karuppaswamy et al. | 296/187.05 |
| 6,004,065 A * | 12/1999 | Higdon et al. | 403/384 |
| 6,141,837 A * | 11/2000 | Wisniewski | 24/295 |
| 6,196,756 B1 * | 3/2001 | Leverger | 403/326 |
| 6,206,606 B1 * | 3/2001 | Mita et al. | 403/320 |
| 6,267,543 B1 * | 7/2001 | David et al. | 411/552 |
| 6,353,981 B1 * | 3/2002 | Smith | 24/295 |
| 6,398,473 B1 * | 6/2002 | Kraus | 411/508 |
| 6,438,804 B1 * | 8/2002 | Romero Magarino | 24/289 |
| 6,454,507 B1 * | 9/2002 | Romero Magarino | 411/508 |
| 6,481,942 B2 * | 11/2002 | Tanaka | 411/45 |
| 6,540,463 B2 * | 4/2003 | Ward | 411/173 |
| 6,616,479 B1 * | 9/2003 | Jones | 439/567 |
| 6,665,914 B2 * | 12/2003 | Ogawa | 24/297 |
| 6,679,646 B2 * | 1/2004 | Quardt et al. | 403/348 |
| 6,718,599 B2 * | 4/2004 | Dickinson et al. | 24/295 |
| 6,769,724 B2 * | 8/2004 | Krispin | 292/153 |
| 6,773,215 B2 * | 8/2004 | Cuva et al. | 411/553 |
| 6,827,536 B1 * | 12/2004 | Leon et al. | 411/61 |
| 6,955,515 B2 * | 10/2005 | Barina et al. | 411/508 |
| 2001/0036392 A1 * | 11/2001 | Reddicliffe | 411/349 |
| 2001/0041113 A1 * | 11/2001 | Antonucci et al. | 411/553 |
| 2003/0143053 A1 * | 7/2003 | Kanie | 411/45 |
| 2004/0170491 A1 * | 9/2004 | Hulin et al. | 411/553 |
| 2004/0223826 A1 * | 11/2004 | Leon et al. | 411/44 |

* cited by examiner

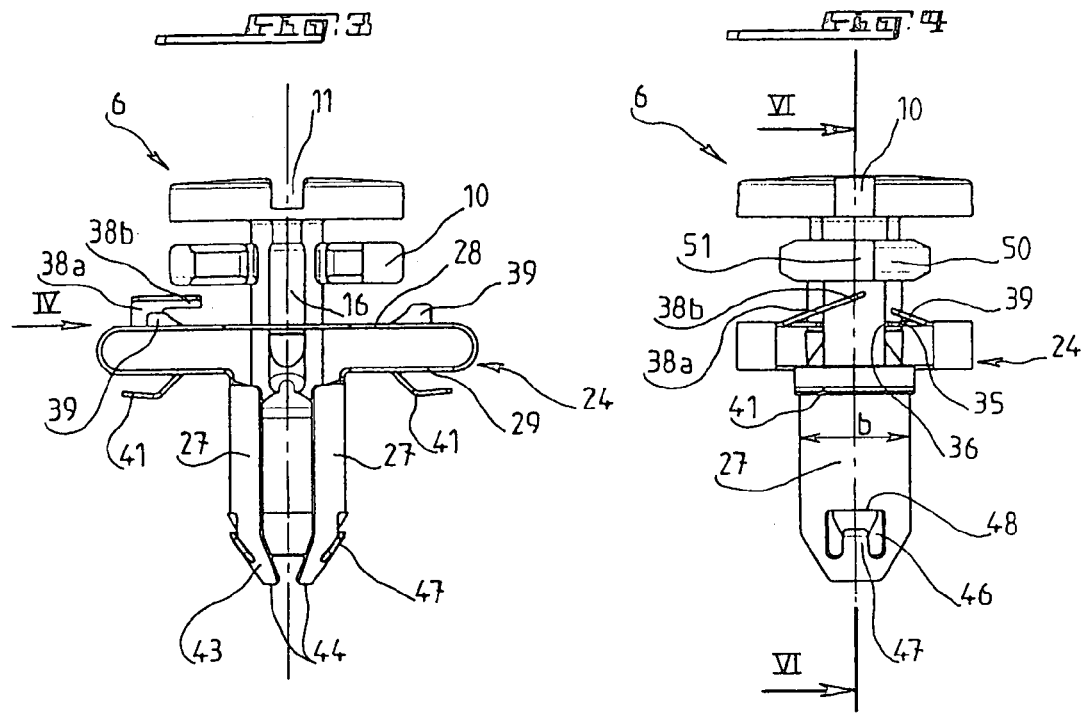
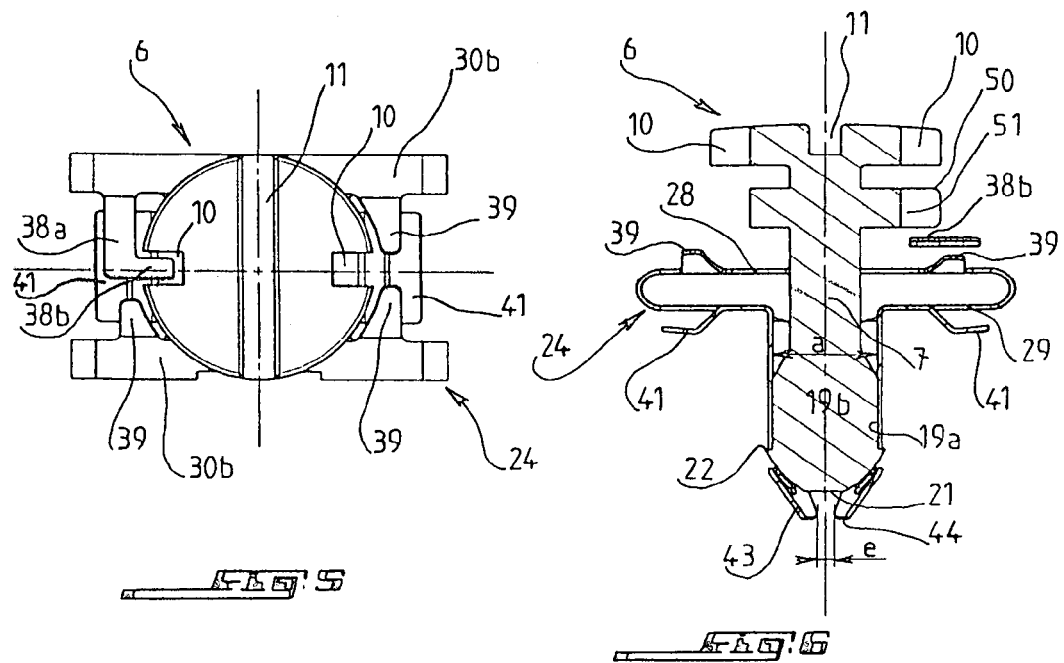

FASTENING DEVICE, PARTICULARLY FOR HOLDING TOGETHER A STACK OF AT LEAST TWO PANELS

The invention pertains to a fastening device, particularly for holding together a stack of at least two panels, of the type which has a female piece in the form of a clasp consisting of a head capable of elastic deformation in the axial direction and a hollow foot, which can be engaged in holes that pass through said stack of panels and which has two tabs that can elastically separate from one another, moving between an unseparated position for insertion of the foot into said holes and a separated position for holding the stack of panels together; a male piece, which has a part in the form of a head and a part in the form of a shaft with a cross section in the form of a cam that can be inserted axially into said clasp, which engages between the tabs of the foot of the clasp and rotating therein, between an angular position of non-separation of the tabs and an angular position of separation of the tabs, as well as a means to prevent premature rotation of the male piece in the female piece in the separated tabs position.

A fastening device of this type is known from French Patent No. 2 790 046. In this device, the rotation prevention means comprises protuberances on the upper surface of the head of the clasp, each of which is capable of engaging in the periphery of the head of the male piece when it is in its position of separation of the tabs of the foot of the clasp. The disadvantage of this means is that it can no longer ensure angular immobilization of the male piece in the female piece when the stack of panels is subjected to vibrations.

The present invention aims to palliate the disadvantage just described concerning the known fastening device.

In order to realize this aim, the fastening device according to the invention is characterized by the fact that the aforementioned component is produced in the form of a finger which can be moved by deliberate action between a position of engagement in a notch in the periphery of the head of the male piece and a position of disengagement from this notch, when the male and female pieces occupy their relative angular position of separation of the tabs in the head of the male piece.

According to one characteristic of the invention, the finger is arranged at the end of a projecting element, capable of elastic deformation in the axial direction of the device.

According to another characteristic of the invention, the head of the female piece is cut out, and the component capable of elastic deformation projects into the cutout of the head from the edges of the head.

According to yet another characteristic of the invention, the finger can be moved by a force acting on the finger in the axial direction of the device.

According to yet another characteristic of the invention, the head of the female piece has the profile of a C whose bent edges are roughly parallel to the base wall and delimit with the latter a space for receiving of an element for axial immobilization of the male piece in the female piece when the male piece is pressed into the female piece and is in its position angularly offset from its position of separation of the tabs, the immobilizing element being connected to the head of the male piece.

According to another characteristic of the invention, the element for axial immobilization ensures immobilization of the male piece in the female piece in the pressed in position of non-separation of the tabs, allowing withdrawal of the assembly formed by the two pieces from the holes of the panels.

According to another characteristic of the invention, the periphery of the immobilizing element contains portions (50) projecting in the radial direction of the device, which, in the position of axial pressing of the male piece into the female piece, pass through the cutout of the head of the female piece and engage behind portions for delimiting the cutout in the head in the positions angularly offset from the position of compression and separation of the tabs.

The invention will be better understood and other characteristics, details and advantages of it will appear more clearly in the course of the following explanatory description given in reference to the appended drawings given only by way of example illustrating an embodiment of the invention and in which:

FIG. 3 is a vertical section of the device according to FIG. 2;

FIG. 4 is a view in the direction of arrow IV of FIG. 3;

FIG. 5 is a top view of the device according to FIG. 3;

FIG. 6 is a longitudinal section along line VI—VI of FIG. 4; and

Figure 1:
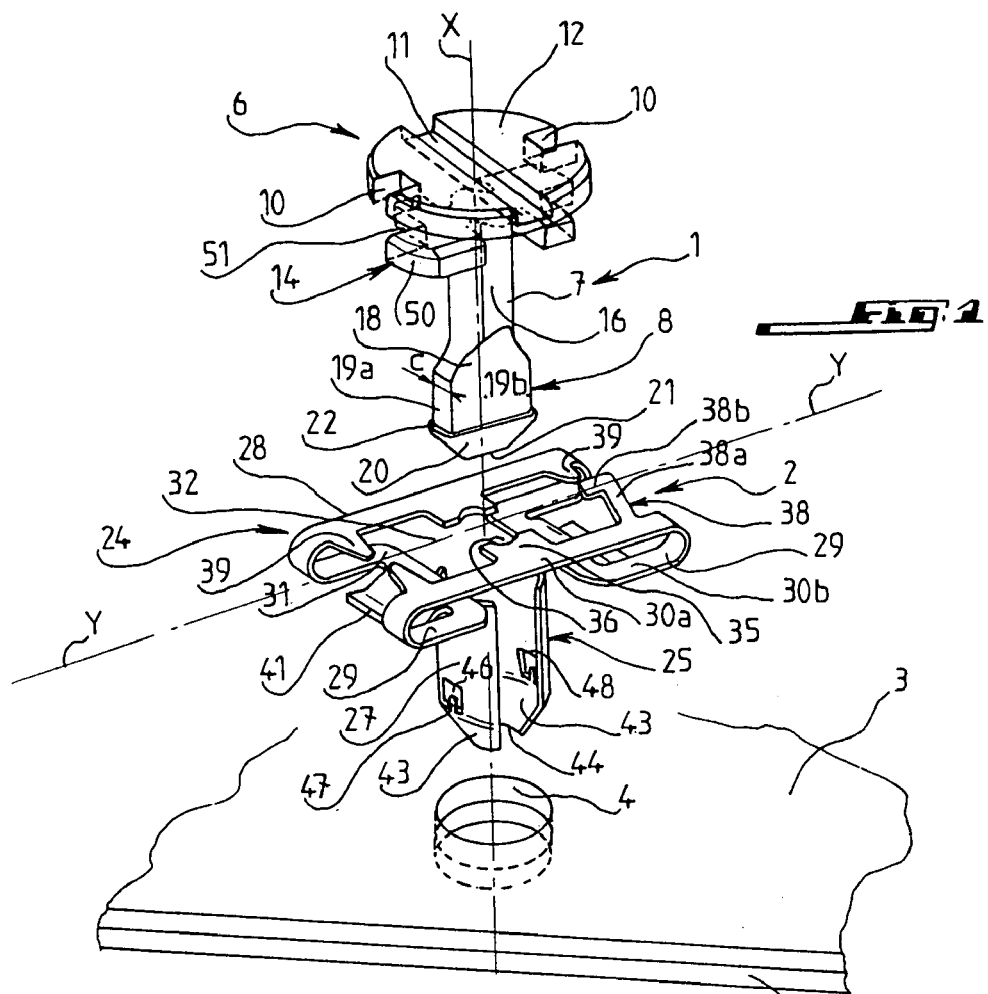
FIG. 1 is a perspective view in exploded form of a fastening device according to the invention before insertion into a stack of panels.
Figure 2:
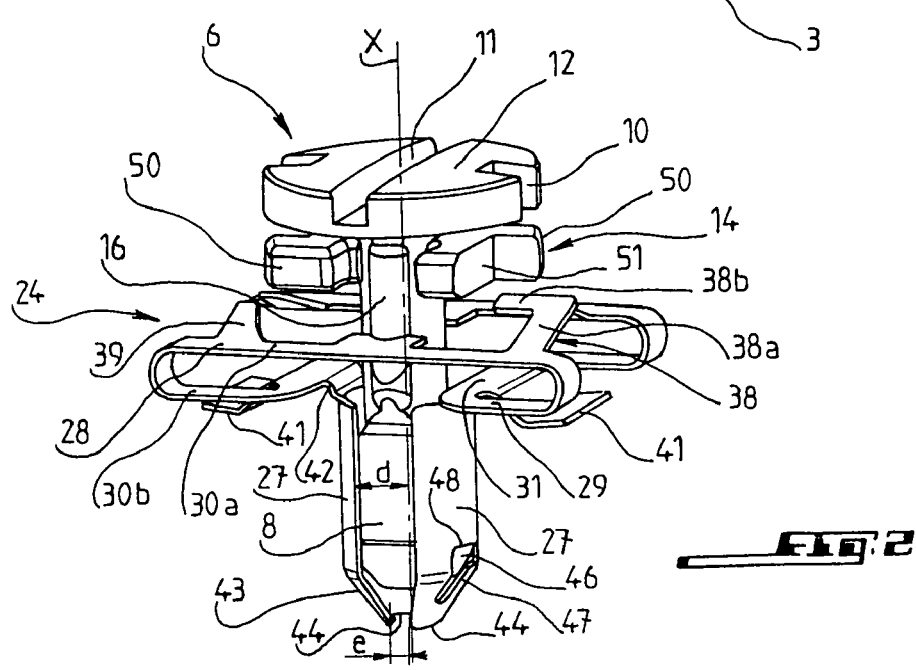
FIG. 2 is a perspective view of the fastening device according to FIG. 1, in the pre-assembled state.

FIG. 1 shows a fastening device according to the invention, made up of two cooperating pieces, male piece 1 and female piece 2, which are intended to hold together two plates 3 provided with circular holes 4 for passage of the female element.

The male piece, advantageously made of plastic material, has a part in the form of head 6 at the upper end of shaft 7 whose other end is configured so as to be in the form of cam 8.

More precisely, head 6 is in the form of a circular disk having on its periphery two diametrically opposed radial notches 10, generally rectangular in shape, and diametral groove 11 in exterior front surface 12. Head 6 extends perpendicularly to shaft 7.

At a predetermined distance from head 6, male piece 1 also has element 14 for axial immobilization of the piece, which projects radially from shaft 7 and has a particular shape which will be described below.

Between head 6 and cam 8, shaft 7 has a generally circular with two longitudinal ribs 16 that project radially outwardly, angularly at the level of diametral groove 11, and which are arranged so as to be diametrically opposite to one another.

The part in the form of cam 8 constitutes a diametral widening of shaft 7 with a flattening of the shaft perpendicular to the direction of widening. The cam has, in the direction of its end, transition portion 18 of gradual widening and flattening, a middle portion of constant length and thickness, and end portion 20 forming an extra thickness in the directions of the width and thickness at junction of the middle and end parts 19. The latter decreases gradually up to end 21 in the form of an edge extending in the direction of the width of the cam. At its origin, extra-thick part 20, with middle part 19, forms shoulder 22, which extends perpendicularly outwardly from the exterior surface of middle part 19.

Female piece 2 consists of a clasp capable of elastic deformation, preferably of metal. Clasp 2 has the general form of a T whose horizontal bar forms cover part 24 and whose vertical bar forms hollow foot 25. In the example represented, the clasp is produced by bending of a piece in the form of a strip cut from a blank. The foot is obtained by the bending of each exterior portion of the piece in the form of a strip around a line perpendicular to the longitudinal direction of the strip. Each portion thus bent to an angle of 90° forms tab 27. The cover part 24 is formed by bending the part of the strip, which is located between the two tabs 27, a predetermined distance from each tab, along a bending line also perpendicular to the longitudinal direction of the strip, to an angle of 180°. One thus obtains exterior horizontal cover wall 28 and walls 29 which are bent so as to form, with part 28, the configuration of a C, the branches of which are parallel to the base. It is observed from these figures that, after this bending, the two tabs 27 extend parallel to one another in order to form hollow foot 25. Thanks to bent walls 29, the cover part is capable of elastic deformation. As is clear from the figures, the portion of the strip forming the cover part, with its exterior walls 28 and bent walls 29, is hollowed out so as generally to form roughly rectangular hollow 32 delimited between edges in the form of longitudinal bars 30a and 30b and transverse bars 31. Each longitudinal bar has portion 30a belonging to exterior horizontal cover wall 28 and portion 30b belonging to bent wall 29. Bars 31 connect the free ends of edges 30b. Tabs 27 are connected to these bars.

The head has various elements which project into hollow 32 from edges 30a and 31. Thus, upper wall 28 of the cover part has, in its central zone, two projections 35 generally rectangular in shape, which are located mutually facing one another, and each has notch 36 in the form of an arc of circle and whose shape is complementary to that of longitudinal rib 16 of shaft 7 so that the rib can be engaged in this notch. The width of each projection 35 corresponds to the diameter of shaft 7.

Wall 28 also has, on a longitudinal side, element 38 in the form of an L, one branch 38a of which extends perpendicularly from longitudinal bar 30a into hollow 32, inclined upwardly out of the plane of part 28. The other free branch 38b forms a locking finger, which is oriented parallel to the longitudinal direction of cover wall 28 in the axis of symmetry, towards projections 35, so that it can be engaged in notches 10 on the periphery of the head of the male element. Element 38 can move elastically between its inclined position of engagement in notch 10 and a position pushed back in the direction of the plane of upper clasp part 28, in which it is released from the notch.

One also observes projecting stub 39 on the other longitudinal edge 30, facing element 38, and another two stubs 39 at symmetrical locations with respect to element 38 and stub 39, with respect to the median transverse axis Y—Y.

The cover part also has, projecting from each transverse bar 31, support tongue 41, which has a profile in the form of a very open V, the base of which is out of the plane of curved bars 30b, on the outside of the cover part. It is by means of these tongues that the cover part rests on upper plate 3 in its stack fastening position.

With regard to the configuration of foot 25 of clasp 2, each of the two tabs 27 forming it is curved so as to have a profile in the form of an arc of circle concentric with respect to axis X—X of the fastening device. In order to allow the curvature of tabs 27, the tabs are connected to the exterior edges of transverse bars 31 over just an intermediate part 42 of their width. Tabs 27 are configured at the level of their free end zone 43 so as to be radially converging. In this part, the tabs have the profile of a partially truncated conical surface. Thus, free ends 44 of the two truncated conical ends 43 are separated from one another less than the separation a between the two adjacent free longitudinal edges of the two tabs 27.

Separation a of the tabs from one another at the level of the bottoms of their curvatures 27 is slightly greater than width b of cam 8 so as to allow axial movement of the cam in the hollow delimited by the tabs without causing the separation of these tabs. Separation only occurs when the cam engages between ends 44 of the tabs. It should also be noted that the thickness c of the cam is less than separation d of the exterior longitudinal edges of the tabs and also advantageously less than the separation e between ends 44 at the level of the exterior longitudinal edges.

It is also observed that opening 46 is cut in each tab 27 of foot 25 and is in the form of a U-shaped slot whose base is at the site of origin of the zone of radial convergence 43 and whose branches extend in the direction of the free end of the tabs.

Part 47 of converging part 43, which delimits the interior edge of opening 46, is in the form of a rectangular tongue. Upper edge 48 of the base of the U is arranged so as to produce a pre-assembly of male and female parts 1 and 2 when the male part is axially introduced into the female part, shoulder 22 of the cam then engaging behind edge 48 of openings 46.

Figure 7:
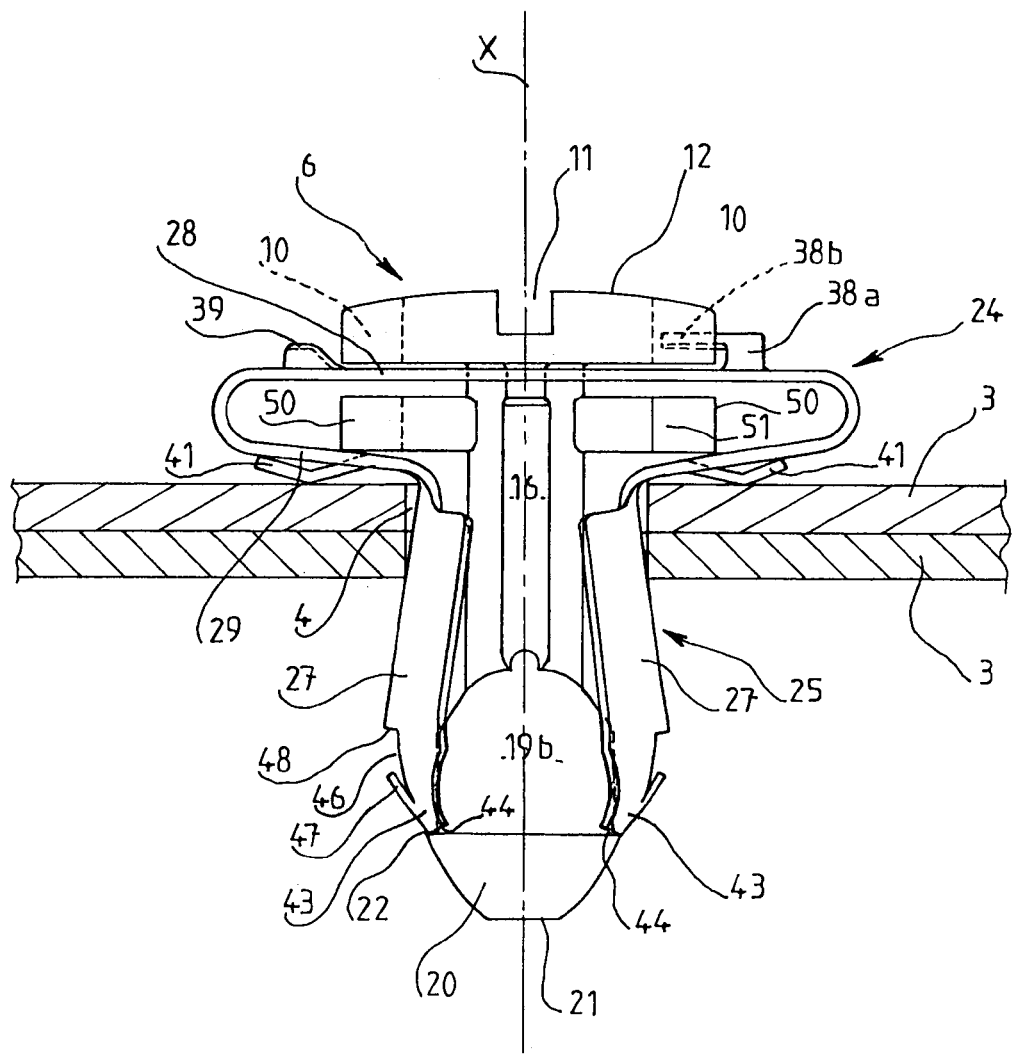
FIG. 7 is a vertical section in enlarged scale showing the device in its position of immobilization of a stack of plates.

After having described the structure of the male and female pieces, one now describes the form of head element 14. This element 14, as shown in FIG. 7, is intended for being placed, once male piece 1 is axially introduced into the female piece up to its final position of axial introduction, between exterior wall 28 of the cover part and curved walls 29. Element 14 is configured so as to allow the introduction of male piece 1, in its orientation represented in FIG. 6, up to its final axial position without being hindered by locking finger 38 but ensuring the immobilization of the male piece after rotation in the position of non-separation of the tabs, particularly by an angle of 90° with respect to FIG. 6, but also already before reaching this position.

To execute the aforementioned functions, supplementary head element 14 has two lateral protuberances 50 which are diametrically opposed and arranged in such a way that when the male element occupies its pressed in position of non-separation of tabs 27, these element engage under longitudinal bars 30a of cover part 24. Element 14 also has peripheral cutouts 51 which allow its passage when the male piece is pressed into the female piece, without being hindered by locking finger 38b, in the relative angular position of the two pieces illustrated in FIG. 6.

The fastening device according to the invention is used and operates in the following manner.

For assembling, fastening and holding together, for example, two panels 3 according to FIG. 1, it is possible, in a first step, to push clasp 2 through holes 4 passing through these panels and then to press male element 1 into the female element so that in the relative angular position represented in FIG. 1, head element 14 can pass in front of locking finger 38 thanks to corresponding cutouts 51 formed on its periphery. When the male element is first pressed in all the way, its cam part 8, sliding in the space between tabs 27, does not bring about any separation of these tabs. It is only when the cam, by its small lateral sides 19a, comes in contact with radially converging part 43 at the end of the tabs and finally with lower edges 44 of these tabs, that the tabs are forced to separate and thus ensure the holding together of panels 3, as seen clearly from FIG. 7. In this final pressed in position, lower edges 44 of tabs 27 engage on shoulder 22 of cam 8, thus ensuring the axial locking of male piece 1 in female piece 2 in its position of separation of the tabs. Given that in this position of maximum axial pressing in of male piece 1 and of separation of tabs 27 of female piece 2, immobilizing finger 38 of cover part 24 of the female piece is engaged in peripheral notch 10 of head 6 of the male piece, and the latter is immobilized in this relative angular position. Any inopportune angular movement of piece 1 is thus rendered impossible without deliberate intervention for the purpose of pushing immobilizing finger 38 back downward, that is in the axial direction of the device, a predetermined distance, to the point that this finger disengages from the notch. After this disengagement, the male piece can certainly be made to turn in the female piece but nevertheless remains axially locked therein thanks to protuberances 50 of head element 14 which are now below bars 30a of the cover part of the female piece. Thus, it is possible to bring the male piece to its position of non-separation of tabs 27, in which their ends 44 are facing large surfaces 19b of the cam. In this relative angular position of the male and female pieces, the device can be removed from holes 4, but with the male piece still axially immobilized in the female piece.

It should be noted that the process of positioning the device in holes 4 of panels 3 can also begin, first, by pressing male piece 1 into female piece 2 before engagement of the latter in holes 4, for example, to the point that shoulder 22 of cam 8 engages behind edges 48 of openings 46 formed in tabs 27. In this axial position already prohibiting backward movement of male piece 1, tabs 27 are not yet separated, so that the device, thus pre-assembled, can be introduced into holes 4 of the panels. The fastening of panels 3 onto one another is then obtained by pushing the male piece all the way into the female piece.

Of course, various modifications can be made to the fastening device as just described with reference to the figures. Thus, the female element, instead of being produced by bending a strip cut from a blank, can be produced in any other appropriate manner. The shape of cam 8 of the male element can also be different, as could the shape of locking finger 38, for example. In this case, of course, one must ensure that the cooperating elements provided on the other piece have a complementary shape or configuration so that the functions just described are still ensured.

What is claimed is:

1. A fastening device for holding together a stack of at least two panels, each panel having a hole passing there through, the device comprising
   a female piece including
      a clasp consisting of a hollow head capable of elastic deformation in the axial direction and
      a hollow foot which can be engaged in the holes that pass through said stack of panels and which has two tabs that can elastically separate from one another, moving between an unseparated position for insertion of the foot into said holes and a separated position for holding together a stack of panels; and
   a male piece, comprising
      a head and
      a shaft with a cross section in the form of a cam that can be axially inserted into said clasp, which engages between the tabs of the foot of the clasp and rotating therein, between an angular position of non-separation of the tabs and an angular position of separation of the tabs, as well as
      a means of preventing premature rotation of the male piece in the female piece in the position of separation of the tabs, having
         at least one component in the shape of an L having one end projecting from the head of the female piece and
         a notch for receiving the projecting component on the periphery of the head of the male piece in said position of separation, the component comprising another end in the form of a finger which can be moved by intentional action between a position of engagement in the notch and a position of disengagement from said notch, when the male piece and the female piece occupy their relative angular position with respect to the separation of the tabs.

2. The fastening device according to claim 1, wherein the finger is arranged at the end of a projecting element capable of elastic deformation in the axial direction of the device.

3. The fastening device according to claim 2, wherein the component capable of elastic deformation projects into a cutout in the head of the female piece from edges of the head of the female piece.

4. The fastening device according to claim 1, wherein the finger can be moved by a force acting on the finger in the axial direction of the device.

5. The fastening device according to claim 1, wherein the head of the female piece has a profile of a C, and has a base wall, and bent edges roughly parallel to the base wall,
   the bent edges of the head delimiting a space for receiving an immobilizing element for axial immobilization of the male piece in the female piece when the male piece is pressed into the female piece and is in its position angularly offset from its position of separation of the tabs,
   the immobilizing element being connected to the head of the male piece.

6. The fastening device according to claim 5, wherein the immobilizing element for axial immobilization ensures immobilization of the male piece in the female piece in the compressed position of the non-separation of the tabs, allowing withdrawal of the assembly formed by the male and female pieces from the holes of the panels.

7. The fastening device according to claim 5, wherein the immobilizing element has on its periphery, portions projecting in the radial direction of the device, which, in the position of axial pressing of the male piece into the female piece, pass through a hollow of the head of the female piece and engage behind portions for delimiting the hollow in the head in the positions angularly offset from the position of compression and separation of the tabs.

8. A fastening device for holding together a stack of at least two panels, each panel having a hole passing there through, the device comprising
   a female piece including
      a clasp consisting of a head capable of elastic deformation in the axial direction and
      a hollow foot which can be engaged in the holes that pass through said stack of panels and which has two tabs that can elastically separate from one another, moving between an unseparated position for insertion of the foot into said holes and a separated position for holding together a stack of panels; and
   a male piece, comprising
      a head and
      a shaft with a cross section in the form of a cam that can be axially inserted into said clasp, which engages between the tabs of the foot of the clasp and rotating therein, between an angular position of non-separation of the tabs and an angular position of separation of the tabs, as well as a means of preventing premature rotation of the male piece in the female piece in the position of separation of the tabs, having at least one component projecting from the head of the female piece and a notch for receiving the projecting component on the periphery of the head of the male piece in said position of separation, the component comprising a finger which can be moved by intentional action between a position of engagement in the notch and a position of disengagement from said notch, when the male piece and the female piece occupy their relative angular position with respect to the separation of the tabs and wherein the head of the female piece has a profile of a C, and has a base wall, and bent edges roughly parallel to the base wall, the bent edges of the head delimiting a space for receiving an immobilizing element for axial immobilization of the male piece in the female piece when the male piece is pressed into the female piece and is in its position angularly offset from its position of separation of the tabs, an immobilizing element extending radially from the shaft at a predetermined distance from the head of the male piece, wherein the immobilizing element comprises two lateral protuberances which are diametrically opposed and the protuberances have peripheral cutouts which allow passage of the immobilizing element without hindrance by the finger when the male piece is pressed into the female piece.

9. A fastening device for holding together a stack of at least two panels, each panel having a hole passing there through, the device comprising a female piece including a clasp consisting of a head capable of elastic deformation in the axial direction and a hollow foot which can be engaged in the holes that pass through said stack of panels and which has two tabs that can elastically separate from one another, moving between an unseparated position for insertion of the foot into said holes and a separated position for holding together a stack of panels; and a male piece, comprising a head and a shaft with a cross section in the form of a cam that can be axially inserted into said clasp, which engages between the tabs of the foot of the clasp and rotating therein, between an angular position of non-separation of the tabs and an angular position of separation of the tabs, as well as a means of preventing premature rotation of the male piece in the female piece in the position of separation of the tabs, having at least one component projecting from the head of the female piece and a notch for receiving the projecting component on the periphery of the head of the male piece in said position of separation, the component comprising a finger which can be moved by intentional action between a position of engagement in the notch and a position of disengagement from said notch, when the male piece and the female piece occupy their relative angular position with respect to the separation of the tabs and wherein the head of the female piece has a profile of a C, and has a base wall, and bent edges roughly parallel to the base wall, the bent edges of the head delimiting a space for receiving an immobilizing element for axial immobilization of the male piece in the female piece when the male piece is pressed into the female piece and is in its position angularly offset from its position of separation of the tabs, an immobilizing element extending radially from the shaft at a predetermined distance from the head of the male piece, wherein the immobilizing element comprises at least one lateral protuberance and the protuberance has a peripheral cutout which allows passage of the immobilizing element without hindrance by the finger when the male piece is pressed into the female piece.

* * * * *